(12) United States Patent
Leach

(10) Patent No.: US 10,397,106 B2
(45) Date of Patent: Aug. 27, 2019

(54) MOBILE CONDITIONS AWARE CONTENT DELIVERY NETWORK

(71) Applicant: Fastly, Inc., San Francisco, CA (US)

(72) Inventor: Sean Leach, Castle Pines, CO (US)

(73) Assignee: Fastly, Inc., San Francisco, CA (US)

( * ) Notice: Subject to any disclaimer, the term of this patent is extended or adjusted under 35 U.S.C. 154(b) by 77 days.

(21) Appl. No.: 14/734,672

(22) Filed: Jun. 9, 2015

(65) Prior Publication Data

US 2016/0366055 A1 Dec. 15, 2016

(51) Int. Cl.
| | |
|---|---|
| *H04L 12/721* | (2013.01) |
| *H04L 12/26* | (2006.01) |
| *H04W 24/08* | (2009.01) |
| *H04W 24/10* | (2009.01) |
| *H04W 28/02* | (2009.01) |

(52) U.S. Cl.
CPC .......... *H04L 45/70* (2013.01); *H04L 43/0829* (2013.01); *H04L 43/0888* (2013.01); *H04W 24/08* (2013.01); *H04L 43/06* (2013.01); *H04W 24/10* (2013.01); *H04W 28/0231* (2013.01)

(58) Field of Classification Search
CPC ........................ H04L 69/1097; H04L 67/2842
See application file for complete search history.

(56) References Cited

U.S. PATENT DOCUMENTS

| | | | |
|---|---|---|---|
| 2008/0235400 A1 | 9/2008 | Slocombe et al. | |
| 2008/0242290 A1* | 10/2008 | Bhatia | H04L 12/5895 455/422.1 |
| 2011/0078327 A1 | 3/2011 | Li et al. | |
| 2011/0131319 A1* | 6/2011 | Harrang | H04L 47/11 709/224 |
| 2011/0196943 A1 | 8/2011 | Bornstein et al. | |
| 2012/0290677 A1 | 11/2012 | Puthalath et al. | |
| 2013/0301424 A1* | 11/2013 | Kotecha | H04W 4/06 370/242 |
| 2014/0115090 A1* | 4/2014 | Hasek | H04L 67/2823 709/213 |
| 2014/0181186 A1* | 6/2014 | Stevens | H04L 67/322 709/203 |
| 2014/0280679 A1* | 9/2014 | Dey | H04L 67/2842 709/213 |
| 2014/0280906 A1 | 9/2014 | Johns et al. | |
| 2015/0026315 A1 | 1/2015 | Bergman et al. | |
| 2015/0081884 A1 | 3/2015 | Maguire et al. | |
| 2015/0163296 A1* | 6/2015 | Arolovitch | H04L 65/4084 709/203 |
| 2015/0237552 A1* | 8/2015 | White | H04W 36/14 370/331 |
| 2016/0006805 A1* | 1/2016 | Ulupinar | H04L 67/02 709/217 |

(Continued)

FOREIGN PATENT DOCUMENTS

WO WO2010052570 A1 5/2010

*Primary Examiner* — Rhonda L Murphy

(57) ABSTRACT

A content delivery network is configured to receive information about wireless network conditions from a wireless device. The wireless device is configured to provide information about the conditions of the wireless device and/or the conditions of the network the wireless device is being served by. These conditions can then be used to help optimize content delivery to the wireless device or similarly situated wireless devices.

21 Claims, 7 Drawing Sheets

(56) References Cited

U.S. PATENT DOCUMENTS

| | | | |
|---|---|---|---|
| 2016/0072911 A1* | 3/2016 | Velummylum | H04W 4/025 709/224 |
| 2016/0135143 A1* | 5/2016 | Won | H04W 72/005 370/312 |

* cited by examiner

MOBILE CONDITIONS AWARE CONTENT DELIVERY NETWORK

TECHNICAL FIELD

Aspects of the disclosure are related to the field of packet communication networks and delivery of content from a source server to wireless device via a content delivery network.

TECHNICAL BACKGROUND

Internet web pages, online information, and media content such as audio, video, photographs, and the like are requested and delivered to wireless end users via computer network systems and wireless networks. Requests for the content are sent over a wireless network, to a wired network, and to a source server, processed, and the content is delivered to the end user via the wireless and wired networks. The source server can include origin or hosting servers which originally host the network content. Unfortunately, a single source server may not be able to serve a large number of concurrent requests for content. In addition, the requesting server may be distant geographically or network routing-wise from the source server. This can slow the process of delivering content to the point where users are dissatisfied, or abandon the request for content.

To address this problem, content delivery networks were developed. Content delivery networks cache content from a source server (a.k.a. origin server) for more rapid and reliable delivery to end users. A content delivery network may have many (or even thousands) content nodes distributed across a large geographic area (or network routing area) in order to provide faster, lower latency, and more reliable access to content for the end users regardless of their geographic or network location.

The content delivery process begins with a user submitting a request to a browser. When a user enters a uniform resource locator (URL), a domain name system (DNS) request is triggered and an IP address is retrieved. In a content delivery network structure, the domain name of the URL is translated by a mapping system into the IP address of cache node, which can have the content cached locally, to serve the content to the user. If the content is cached by the cache node, the cache node can directly service the end user's request. If the content is not cached in the cache node, or the content from the origin server is out-of-date or stale, the cache node can receive the content from the origin server and cache it. Once cached, the cache node can typically provide the content quickly.

When content is served to wireless devices, however, selecting a cache node to service the wireless device can be problematic. Likewise, the collection of measurements and metrics used to optimize a content delivery network can be affected by conditions within the wireless network. In other words, wireless network conditions (e.g., loading, internal structure, RF conditions, interference, etc.) can make the selection of a cache node, or the collection of measurements and metrics associated with the wireless device, difficult, unreliable, or poorly optimized.

Overview

Systems, methods, apparatuses, and software for ensuring delivery of content from an origin server to a content delivery network are disclosed herein. In one example, A method of operating a communication system includes providing a content delivery network (CDN) having a set of cache nodes (CN) to provide content delivery on behalf of a set of participating content providers. At least one of the set of content providers sources content for delivery by the CDN from an origin server. The method also includes receiving, by the CDN, a request for content. The request for content coming from a wireless device and requesting content sourced by the origin server. The method also includes receiving, by the CDN and from the wireless device, at least one indicator of wireless device conditions. The method also includes, based on the at least one indicator of wireless device conditions, selecting service parameters for delivery of content requested by the wireless device.

In another example, a communication system includes a content delivery network (CDN) having a set of cache nodes (CN) to provide content delivery on behalf of a set of participating content providers. At least one of the set of content providers is to source content for delivery by the CDN from an origin server. The CDN is to receive a request for content from a wireless device. The request for content is directed to obtaining content, from the origin server, which is cached by the CDN. The communication system also includes a processor to receive, from the wireless device, at least one indicator of wireless device conditions. Based on the at least one indicator of wireless device conditions, the processor is to select content delivery conditions for delivery of cached content from the CDN to the wireless device.

In another example, a method of operating a content delivery network (CDN), includes receiving, from wireless device, a request for content to be provided by the CDN on behalf of an origin server. The method also includes configuring the wireless device to provide the CDN with at least one wireless device conditions indicator. The method also includes, based on the at least one wireless device conditions indicator, selecting a CDN configuration to provide the requested content to the wireless device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple examples are described in connection with these drawings, the disclosure is not limited to the examples disclosed herein. On the contrary, the intent is to cover all alternatives, modifications, and equivalents.

DETAILED DESCRIPTION

Network content, such as web content, typically comprises text, hypertext markup language (HTML) pages, pictures, digital media content, video, audio, code, scripts, or other content viewable and rendered by a wireless end user device. This network content can be stored and served by origin servers that are owned or operated by content originators. When cache nodes (a.k.a., content servers) or a content delivery network are employed, such as in FIG. 1, the cache nodes can act as proxies that cache network content for delivery to wireless devices. The cache nodes can maintain recently accessed and popular content as cached from the origin servers. Thus, cache nodes exchange data with the origin servers when new or un-cached information is requested by the wireless devices, or if the content source data has changed.

To provide optimized delivery of content to all user devices (both wired and wireless), a content delivery network can take measurements of network parameters. These network parameters may include response times, latency, congestion, packet loss, throughput, etc. Such parameters are typically relatively static. That is, from content request to content request from a particular user device (or local ISP network), the network conditions remain relatively constant. This allows the content delivery network to use measured network parameters to optimize the delivery of content cached in the content delivery network.

Wireless user devices, however, may have conditions that rapidly change. Thus, any optimizations based on measured network parameters may be unreliable when applied to wireless devices being served by a wireless (e.g., cell phone) service provider. Accordingly, in an embodiment, the content delivery network is configured to receive information about wireless network conditions from the wireless device. The wireless device is configured to provide information about the conditions of the wireless network it is being served by. These network conditions can then be used to help optimize content delivery to the wireless device (or similar wireless devices—e.g., those on the same wireless network).

For example, a wireless device may be experiencing adverse network conditions (e.g., packet loss, throughput, etc.) that are not caused by the selection of a cache node. Accordingly, once it is determined that the content delivery network is not responsible for these conditions, the content delivery network can reduce the influence these factors have on its optimization and/or delivery processes.

Figure 1:
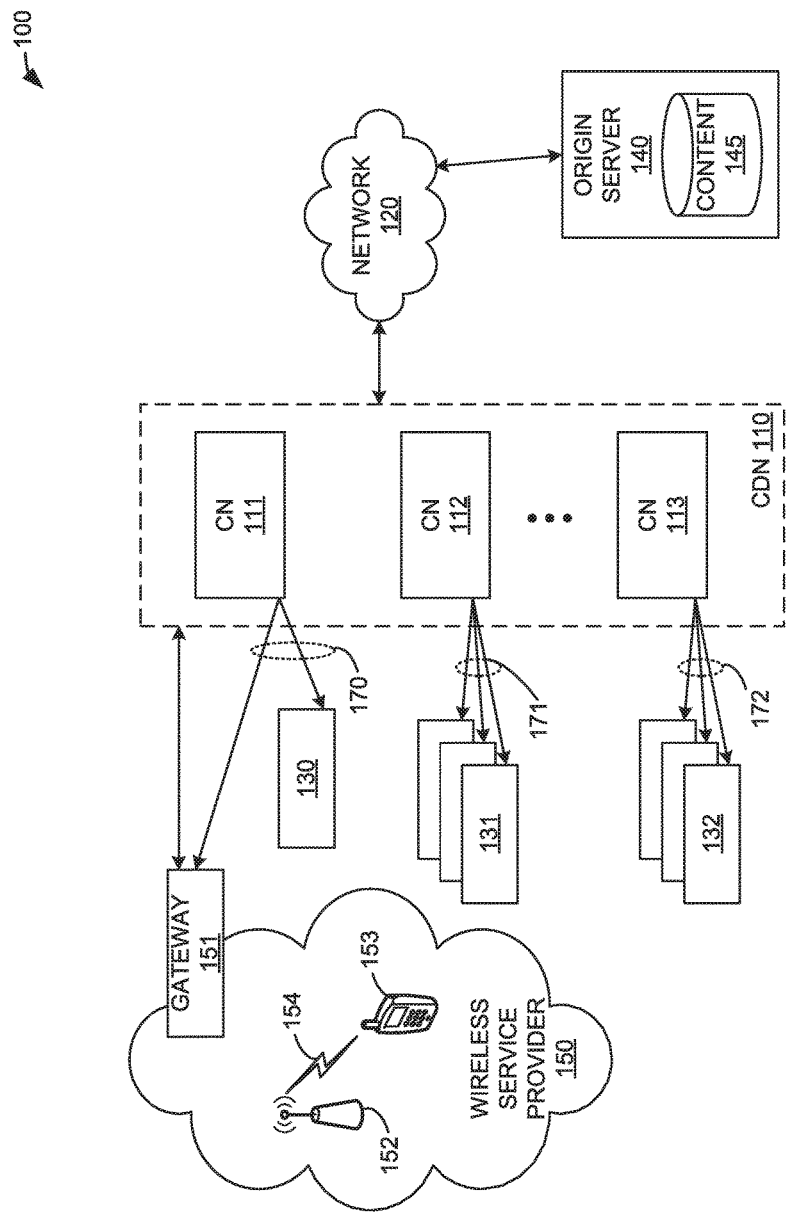
FIG. 1 illustrates a communication system.

FIG. 1 illustrates a communication system. In FIG. 1, communication system 100 comprises content delivery network (CDN) 110, network 120, end user devices 130-132, origin server 140, and wireless service provider network 150. Content delivery network 110 includes cache nodes 111-113. Origin server 140 includes content 145. End user devices 130-132 are operatively coupled to cache nodes 111-113, respectively, by links 170-172. Origin server 140 is operatively coupled to content delivery network 110 (and thus cache nodes 111-113) via network 120. Network 120 can route communication between content delivery network 110 and cache node 140.

Wireless service provider network 150 (a.k.a., wireless network 150) includes gateway 151, base station 152, and wireless device 153. Wireless device 153 is operatively coupled to base station 152 by wireless link 154. Wireless network 150 is operatively coupled to content delivery network 110 via gateway 151. Gateway 151 is operatively coupled to content delivery network 110. Gateway 151 can be operatively coupled to a cache node 111 by link 170. Thus, wireless device 153 is operatively coupled to cache node 111 via wireless link 154, base station 152, wireless network 150, and gateway 151. Gateway 151 provides wireless network 150 with access to the internet.

End user devices 130-132 and wireless device 153 are representative of a plurality of end user devices which can request and receive network content which is sourced form origin server 140. Any number of end user devices 130-132 or wireless devices 153 can be associated with each of cache nodes 111-113. Cache nodes 111-113, end users 130-132 and wireless device 153 communicate over associated network links 170-172. Content delivery network 110 and origin server 140 communicate via network 120. Each of cache nodes 111-113 can also communicate with each other over one or more network links (not shown in FIG. 1.)

End user devices 130-132 and wireless device 153 request network content, such as content 145, that is sourced by origin server 140. Instead of these requests being handled by the origin server 140, individual cache nodes 111-113 of content delivery network 110 receive the content requests over ones of links 170-172. The cache node 111-113 responds to and processes the content requests in order to deliver the content to the requesting end user device 130-132 and/or wireless device 153. Requested network content that is already stored in a cache node 111-113 can be provided from the cache node 111-113 directly to the requesting end user device 130-132 and/or wireless device 153 without first retrieving the content 145 from origin server 140. Network content 145 that is not already stored in a cache node 111-113 can be requested by a cache node 111-113 from origin server 140. Once the cache node 111-113 receives the content 145 from origin server 140, the cache node 111-113 can deliver the content 145 to the requesting end user device 130-132 and/or wireless device 153. Each cache node 111-113 that receives the content 145 may also cache the content 145. In this manner, each of cache nodes 111-113 can act as intermediary proxy nodes to provide local and fast access for end user 130-132 and/or wireless device 353 to network content 145 sourced by origin server 140 without additionally burdening origin server 140.

Cache nodes 111-113, end user devices 130-132, wireless device 153, and origin server 140 can each include communication interfaces, network interfaces, processing systems, computer systems, microprocessors, storage systems, storage media, or some other processing devices or software systems, and can be distributed among multiple devices. Examples of cache nodes 111-113 and origin server 140 each include software such as an operating system, logs, databases, utilities, drivers, networking software, and other software stored on a computer-readable medium. Content delivery network 110, in addition to including cache nodes 111-113, can include configurations, equipment, and links to route communications between cache nodes 111-113, end user devices 130-132, wireless device 153, and origin server 140, among other operations.

End user devices 130-132 can each be a user device, subscriber equipment, customer equipment, access terminal, smartphone, personal digital assistant (PDA), computer, tablet computing device, e-book, Internet appliance, media player, game console, smartwatch, or some other user communication apparatus, including combinations thereof.

Wireless device 153 can be a user device, subscriber equipment, customer equipment, access terminal, smartphone, personal digital assistant (PDA), computer, tablet computing device, e-book, Internet appliance, media player, game console, smartwatch, or some other user communication apparatus, including combinations thereof, that is wirelessly coupled to wireless network 150.

Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet), or portions thereof (e.g., network 120.) Communication system 100 can also comprise wireless networks (e.g., wireless network 150), including base station, wireless communication nodes, telephony switches, internet routers, network gateways, computer systems, communication links, or some other type of communication equipment, and combinations thereof.

Wired network protocols that may be utilized by communication system 100 may comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 (and wireless network 150, in particular) may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Links between elements of communication system 100 can be radio frequency, microwave, infrared, or other similar signal. Links between elements of communication system 100 can use a suitable communication protocol, for example, internet protocol, Ethernet, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Other network elements may be present to facilitate communication between among elements of communication system 100 which are omitted for clarity, including additional processing nodes, routers, gateways, and physical and/or wireless data links for carrying data among the various network elements.

In an embodiment, wireless device 153 provides content delivery network 110 with one or more indicators of the conditions wireless device 153 is experiencing on network 150. These conditions may include indicators corresponding to RF conditions and/or wireless network 150 conditions. Wireless device 153 may be configured by content delivery network 110 to provide the one or more indicators. Wireless device 153 may be configured by a program (e.g., app) to provide the one or more indicators. For example, wireless device 153 may provide to content delivery network 110 indicators that relate to the air-interface signal strength, interference, throughput, packet loss, latency, CPU loading, battery condition, routing information, etc.

Based on the indicators provided by wireless device 153, content delivery network 110 may select service parameters for the delivery of content to wireless device 153 (or other wireless devices served by wireless network 150, not shown in FIG. 1). For example, if the throughput reported by wireless device 153 to content delivery network 110 is less than content delivery network 110 can deliver the content to gateway 151, content delivery network 110 may slow down the traffic it sends to wireless device 153. Content delivery network 110 can slow down the traffic it sends to wireless device 153 to better match the actual throughput with wireless device 153. This can conserve the resources of both CDN 110 and wireless network 150.

In another example, based on the indicators provided by wireless device 153 (e.g., routing information), content delivery network 110 may select which cache node 111-113 is to provide the content to wireless device 153. In another example, content delivery network 110 may select a network route from a selected cache node 111-113 to gateway 151 based on the indicators provided by wireless device 153.

Figure 2:
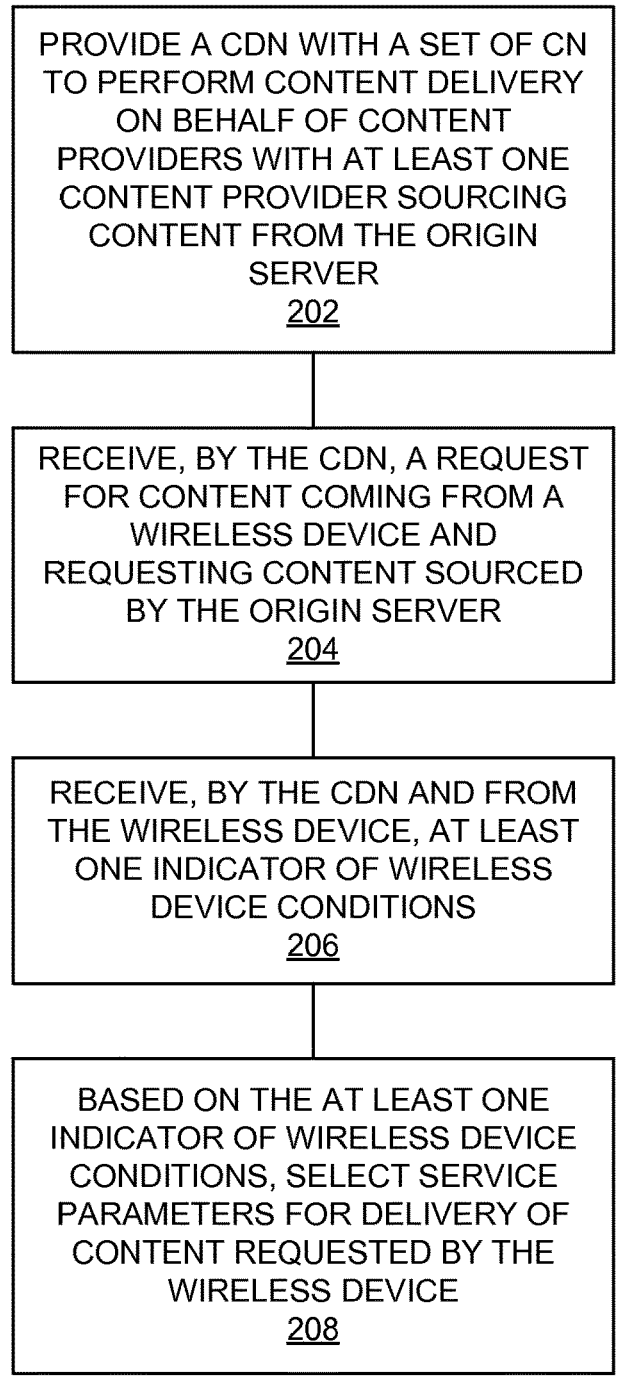
FIG. 2 illustrates a method of operating a content delivery network.

FIG. 2 illustrates a method of operating a content delivery network. The steps illustrated in FIG. 2 may be performed by one or more elements of communication system 100. A content delivery network with a set of cache nodes is provided to perform content delivery on behalf of content providers with at least one content provider sourcing content from an origin server (202). For example, content delivery network 110 with cache nodes 111-113 may perform content 145 delivery to wireless device 153 with origin server 140 sourcing content 145.

A request for content coming from a wireless device and requesting content sourced by the origin server is received by the content delivery network, (204). For example, content delivery network 110 may receive, from wireless device 153, a request for content 145 sourced by origin server 140. From the wireless device, at least one indicator of wireless device conditions is received by the content delivery network (206). For example, content delivery network 110 may receive, from wireless device 153, one or more indicators of the conditions wireless device 153 is experiencing. Examples of the types of conditions that wireless device 153 may report to content delivery network 110 include, but are not limited to, air-interface signal strength, interference, throughput, packet loss, latency, CPU loading, battery condition, routing information, and the like.

Based on the at least one indicator of wireless device conditions, service parameters for delivery of content requested by the wireless device are selected (208). For example, based on the condition(s) reported by wireless device 153 to content delivery network 110, content delivery network may optimize or change parameters used to deliver content to wireless device 153. For example, content delivery network 110 may slow down or speed up the bitrate that the content delivery network 110 is sending to wireless device 153. In another example, content delivery network 110 may select which cache node 111-113 is to provide the content to wireless device 153. In another example, content delivery network 110 may select a network route from a selected cache node 111-113 to gateway 151.

Figure 3:
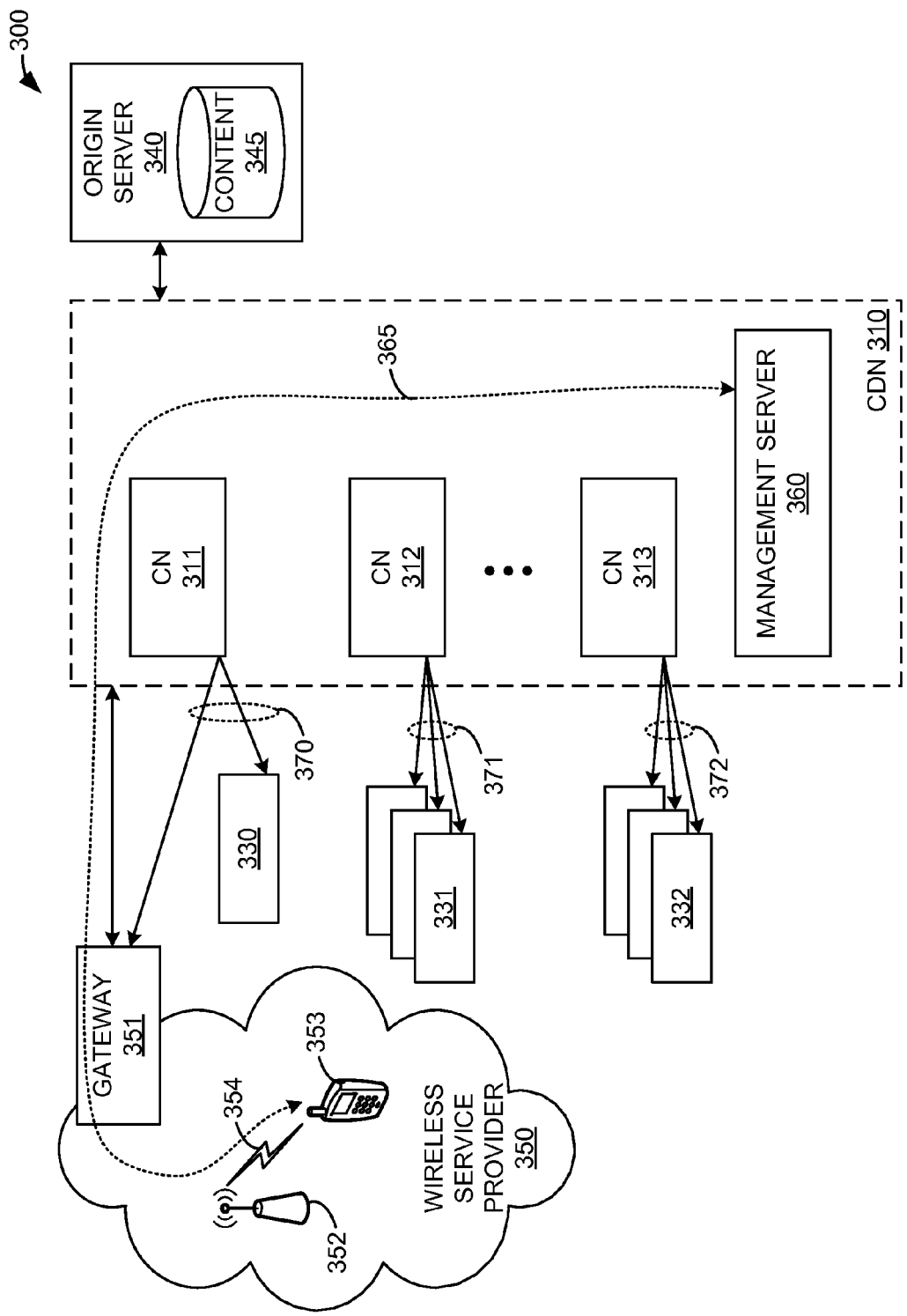
FIG. 3 illustrates a communication system that uses wireless device information.

FIG. 3 illustrates a communication system that uses wireless device information. In FIG. 3, communication system 300 comprises content delivery network (CDN) 310, end user devices 330-332, origin server 340, and wireless service provider network 350. Content delivery network 310 includes cache nodes 311-313 and management server 360. Origin server 340 stores and sources content 345. End user devices 330-332 are operatively coupled to cache nodes 311-313, respectively, by links 370-372. Origin server 340 is operatively coupled to content delivery network 310 (and thus cache nodes 311-313).

Wireless service provider network 350 (a.k.a., wireless network 350) includes gateway 351, base station 352, and wireless device 353. Wireless device 353 is operatively coupled to base station 352 by wireless link 354. Wireless network 350 is operatively coupled to content delivery network 310 via gateway 351. Gateway 351 is operatively coupled to content delivery network 310. Gateway 351 can be operatively coupled to a cache node 311 by link 370.

Thus, wireless device 353 is operatively coupled to cache node 311 via wireless link 354, base station 352, wireless network 350, and gateway 351. Wireless device 353 is also operatively coupled to management server 360 via wireless link 354, base station 352, wireless network 350, and gateway 351 (as shown by link 365). Gateway 351 provides wireless network 350 with access to the internet.

End user devices 330-332 and wireless device 353 are representative of a plurality of end user devices which can request and receive network content which is sourced form origin server 340. Any number of end user devices 330-332 or wireless devices 353 can be associated with each of cache nodes 311-313. Cache nodes 311-313, end users 330-332 and wireless device 353 communicate over associated network links 370-372. Each of cache nodes 311-313 can also communicate with each other over one or more network links (not shown in FIG. 3.)

End user devices 330-332 and wireless device 353 request network content, such as content 345, that is sourced by origin server 340. Instead of these requests being handled by the origin server 340, individual cache nodes 311-313 of content delivery network 310 receive the content requests over ones of links 370-372. The cache node 311-313 responds to and processes the content requests in order to deliver the content to the requesting end user device 330-332 and/or wireless device 353. Requested network content that is already stored in a cache node 311-313 can be provided from the cache node 311-313 directly to the requesting end user device 330-332 and/or wireless device 353 without first retrieving the content 345 from origin server 340. Network content that is not already stored in a cache node 311-313 can be requested by a cache node 311-313 from origin server 340. Once a cache node 311-313 receives the content 345 from origin server 340, the cache node 311-313 can deliver the content 345 to the requesting end user device 330-332 and/or wireless device 353. Each cache node 311-313 that receives the content 345 may also cache the content 345. In this manner, each of cache nodes 311-313 can act as intermediary proxy nodes to provide local and fast access for end user 330-332 and/or wireless device 353 to network content 345 sourced by server 340 without additionally burdening origin server 340.

Cache nodes 311-313, end user devices 330-332, wireless device 353, and origin server 340 can each include communication interfaces, network interfaces, processing systems, computer systems, microprocessors, storage systems, storage media, or some other processing devices or software systems, and can be distributed among multiple devices. Examples of cache nodes 311-313 and origin server 340 each include software such as an operating system, logs, databases, utilities, drivers, networking software, and other software stored on a computer-readable medium. Content delivery network 310, in addition to including cache nodes 311-313 and management server 360, can include configurations, equipment, and links to route communications between cache nodes 311-313, management server 360, end user devices 330-332, wireless device 353, and origin server 340, among other operations.

End user devices 330-332 can each be a user device, subscriber equipment, customer equipment, access terminal, smartphone, personal digital assistant (PDA), computer, tablet computing device, e-book, Internet appliance, media player, game console, smartwatch, or some other user communication apparatus, including combinations thereof.

Wireless device 353 can be a user device, subscriber equipment, customer equipment, access terminal, smartphone, personal digital assistant (PDA), computer, tablet computing device, e-book, Internet appliance, media player, game console, smartwatch, or some other user communication apparatus, including combinations thereof, that is wirelessly coupled to wireless network 350.

Communication system 300 can comprise wired and/or wireless communication networks that include processing nodes, routers, gateways, physical and/or wireless data links for carrying data among various network elements, including combinations thereof, and can include a local area network, a wide area network, and an internetwork (including the Internet), or portions thereof. Communication system 300 can also comprise wireless networks (e.g., wireless network 350), including base station, wireless communication nodes, telephony switches, internet routers, network gateways, computer systems, communication links, or some other type of communication equipment, and combinations thereof.

Wired network protocols that may be utilized by communication system 300 may comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 300 (and wireless network 350, in particular) may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 300, can be, for example, twisted pair cable, coaxial cable or fiber optic cable, or combinations thereof. Links between elements of communication system 300 can be radio frequency, microwave, infrared, or other similar signal. Links between elements of communication system 300 can use a suitable communication protocol, for example, internet protocol, Ethernet, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Other network elements may be present to facilitate communication between among elements of communication system 300 which are omitted for clarity, including additional processing nodes, routers, gateways, and physical and/or wireless data links for carrying data among the various network elements.

In an embodiment, wireless device 353 provides management server 360 of content delivery network 310 with one or more indicators of the conditions wireless device 353 is experiencing on network 350. These conditions may include indicators corresponding to RF conditions and/or wireless network 350 conditions. Wireless device 353 may be configured by management server 360 to provide the one or more indicators. Wireless device 353 may be configured by a program (e.g., app) to provide the one or more indicators to management server 360. For example, wireless device 353 may provide management server 360, via link 365, indicators that relate to the air-interface signal strength, interference, throughput, packet loss, latency, CPU loading, battery condition, routing information, etc.

Based on the indicators provided by wireless device 353, management server 360 may select service parameters for the delivery of content to wireless device 353 (or other wireless devices served by wireless network 350, not shown in FIG. 3). For example, if a throughput reported by wireless device 353 to management server 360 is less than content delivery network 310 can deliver the content to gateway 351, management server 360 may configure content delivery network 310 to slow down the traffic it sends to wireless device 353. Management server 360 can configure content delivery network 310 to slow down the traffic it sends to wireless device 353 to better match the actual throughput with wireless device 353 given the conditions of wireless network 350. This can conserve the resources of both CDN 310 and wireless network 350.

In another example, based on the indicators provided by wireless device 353 (e.g., routing information), management server 360 may select which cache node 311-313 is to provide the content to wireless device 353. In another example, management server 360 may select a network route from a selected cache node 311-313 to gateway 351 based on the indicators provided by wireless device 353.

Figure 4:
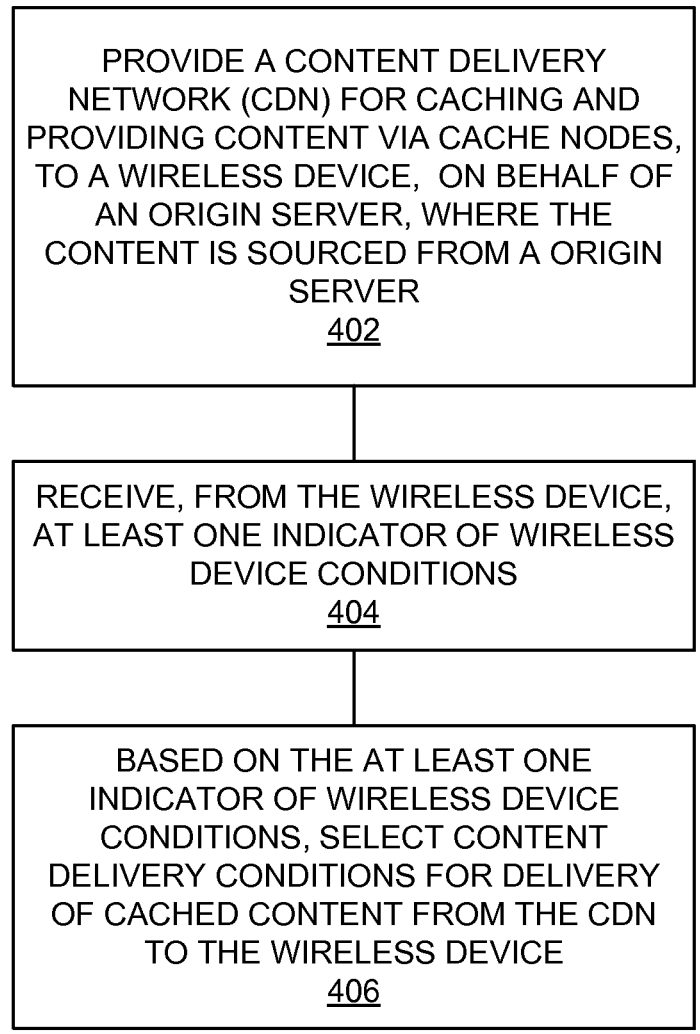
FIG. 4 illustrates a method of operating a content delivery network.

FIG. 4 illustrates a method of operating a content delivery network. The steps illustrated in FIG. 4 may be performed by one or more elements of communication system 100 and/or communication system 300. A content delivery network is provided for caching and providing content via cache nodes to a wireless device on behalf of an origin server where the content is sourced from the origin server (402). For example, access to content delivery network 310 can be provided for caching and providing content on behalf of origin server 340 to wireless device 353.

From the wireless device, at least one indicator of wireless device conditions is received (404). For example, management server 360 may receive one or more indicators, from wireless device 353, of the conditions that wireless device 353 is experiencing. Examples of the types of conditions that wireless device 353 may report to management server 360 include, but are not limited to, air-interface signal strength, interference, throughput, packet loss, latency, CPU loading, battery condition, routing information, and the like.

Based on the at least one indicator of wireless device conditions, content delivery conditions for the delivery of cached content from the content delivery network to the wireless device are selected (406). For example, management system 360 can reconfigure content delivery network 310 based on the information received from wireless device 353. For example, management system 360 can configure content delivery network 310 to slow down or speed up the bitrate that content delivery network 310 is sending to wireless device 353. In another example, management system 360 can configure content delivery network 310 use a particular cache node 311-313 to perform content delivery to wireless device 353. In another example, management system 360 can configure content delivery network 310 to use a particular network route (or a particular gateway 151 to wireless network 350) from a selected cache node 311-313 to wireless device 353.

Figure 5:
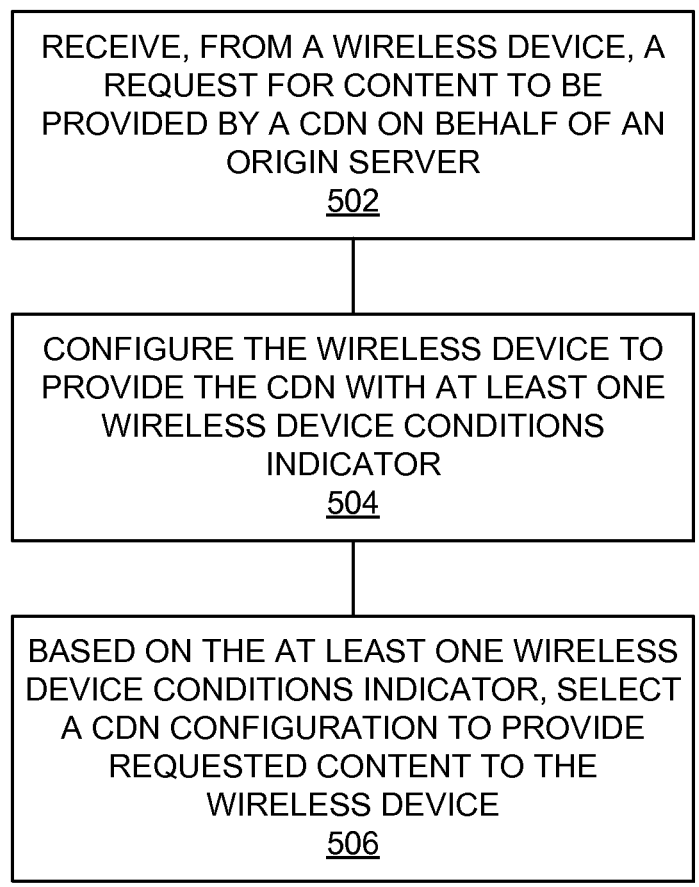
FIG. 5 illustrates a method of configuring a content delivery network.

FIG. 5 illustrates a method of operating a content delivery network. The steps illustrated in FIG. 5 may be performed by one or more elements of communication system 100 and/or communication system 300. From a wireless device, a request for content to be provided by a content delivery network on behalf of an origin server is received (502). For example, content delivery network 310 may receive, from wireless device 353, a request for content 345 sourced by origin server 340.

The wireless device is configured to provide the content delivery network with at least one wireless device conditions indicator (504). For example, management system 360 may configure, via link 365, wireless device 353 to provide management system 360 with one or more indicators of the conditions wireless device 353 is experiencing. Wireless device 353 may be configured by a program (e.g., app) supplied by management system 360 to report the one or more indicators. Examples of the types of condition indicators that wireless device 353 may be configured to report to management system 360 include, but are not limited to, air-interface signal strength, interference, throughput, packet loss, latency, CPU loading, battery condition, routing information, and the like.

Based on the at least one wireless device conditions indicator, a content delivery network configuration to provide requested content to the wireless device is selected (506). For example, management system 360 may select a configuration for content delivery network 310 that slows down or speeds up the bitrate that content delivery network 310 communicates with wireless device 353. In another example, management system 360 may select a configuration for content delivery network 310 that uses a particular cache node 311-313 to perform content delivery to wireless device 353. In another example, management system 360 may select a configuration for content delivery network 310 that uses a particular network route (or a particular gateway 351 to wireless network 350) between a selected cache node 311-313 and wireless device 353.

Figure 6:
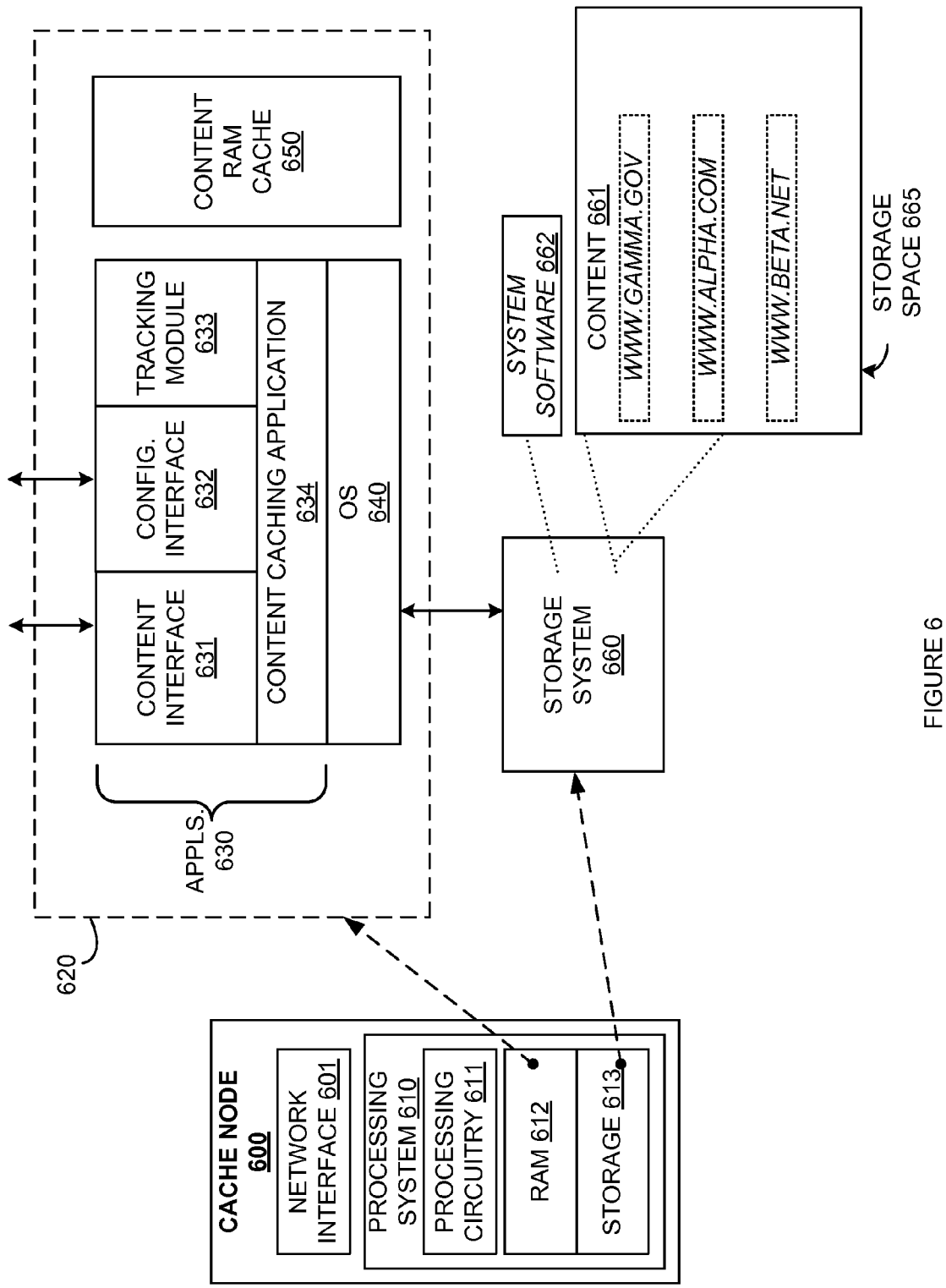
FIG. 6 illustrates a cache node.

To further describe the equipment and operation of a cache node, FIG. 6 is provided which illustrates cache node 600. Cache node 600 can be an example of cache nodes 111-113 of FIG. 1, and cache nodes 311-313 of FIG. 3, although variations are possible. Cache node 600 includes network interface 601 and processing system 610. Processing system 610 includes processing circuitry 611, random access memory (RAM) 612, and storage 613, although further elements can be included, such as discussed in FIGS. 1 and 3. Example contents of RAM 612 are further detailed in RAM space 620, and example contents of storage 613 are further detailed in storage system 660.

Processing circuitry 611 can be implemented within a single processing device but can also be distributed across multiple processing devices or sub-systems that cooperate in executing program instructions. Examples of processing circuitry 611 include general purpose central processing units, microprocessors, application specific processors, and logic devices, as well as any other type of processing device. In some examples, processing circuitry 611 includes physically distributed processing devices, such as cloud computing systems.

Network interface 601 includes one or more network interfaces for communicating over communication networks, such as packet networks, the Internet, and the like. The network interfaces can include one or more local or wide area network communication interfaces which can communicate over Ethernet or Internet protocol (IP) links. Network interface 601 can include network interfaces configured to communicate using one or more network addresses, which can be associated with different network links. Examples of network interface 601 include network interface card equipment, transceivers, modems, and other communication circuitry.

RAM 612 and storage 613 together can comprise a non-transitory data storage system, although variations are possible. RAM 612 and storage 613 can each comprise any storage media readable by processing circuitry 611 and capable of storing software. RAM 612 can include volatile and nonvolatile, removable and non-removable media implemented in any method or technology for storage of information, such as computer readable instructions, data structures, program modules, or other data. Storage 613 can include non-volatile storage media, such as solid state storage media, flash memory, phase change memory, magnetic memory, or as illustrated by storage system 460 in this example. RAM 612 and storage 613 can each be implemented as a single storage device but can also be implemented across multiple storage devices or sub-systems. RAM 612 and storage 613 can each comprise additional elements, such as controllers, capable of communicating with processing circuitry 611.

Software stored on or in RAM 612 or storage 613 can comprise computer program instructions, firmware, or some other form of machine-readable processing instructions having processes that when executed a processing system direct cache node 600 to operate as described herein. For example, software drives cache node 600 to receive requests for content, determine if the content is stored in cache node 600, retrieve content from origin servers, transfer content to end user devices, manage data storage systems for handling and storing the content, among other operations. The software can also include user software applications. The software can be implemented as a single application or as multiple applications. In general, the software can, when loaded into a processing system and executed, transform the processing system from a general-purpose device into a special-purpose device customized as described herein.

RAM space 620 illustrates a detailed view of an example configuration of RAM 612. It should be understood that different configurations are possible. RAM space 620 includes applications 630, operating system (OS) 640, and content RAM cache 650. Content RAM cache 650 includes RAM space for temporary storage of content, such as dynamic random access memory (DRAM).

Applications 630 include content interface 631, configuration interface 632, tracking module 633, and content caching application 634. Content caching application 634 handles caching of content and management of storage spaces, such as content RAM cache 650 and storage space 665, as well as exchanges content, data, and instructions via content interface 631, configuration interface 632, and tracking module 633. Content caching application 634 can comprise a custom application, Varnish caching software, hypertext transfer protocol (HTTP) accelerator software, or other content caching and storage applications, including variation, modifications, and improvements thereof. Applications 630 and OS 640 can reside in RAM space 620 during execution and operation of cache node 600, and can reside in system software storage space 662 on storage system 660 during a powered-off state, among other locations and states. Applications 630 and OS 640 can be loaded into RAM space 620 during a startup or boot procedure as described for computer operating systems and applications.

Content interface 631, configuration interface 632, and tracking module 633 each allow a user to interact with and exchange data with content caching application 634. In some examples, each of content interface 631, configuration interface 632, and tracking module 633 comprise an application programming interface (API). Content interface 631 allows for exchanging content for caching in cache node 600 by content caching application 634, and can also receive instructions to purge or erase data from cache node 600. Content interface 631 can retrieve tracking elements as well as network and web page content from origin servers for delivery to end users. Configuration interface 632 allows for altering the configuration of various operational features of content caching application 634. In some examples, configuration interface 632 comprises a scripting language interface, such as Varnish Configuration Language (VCL), Perl, PHP, Javascript, or other scripting or interpreted language-based interfaces. Tracking module 633 can log and track requests by end user devices for tracking elements found in various web pages cached by content node 600, and deliver log data or tracking information to external systems, among other operations. Content interface 631, configuration interface 632, and tracking module 633 can each communicate with external systems via network interface 601 over any associated network links.

Storage system 660 illustrates a detailed view of an example configuration of storage 613. Storage system 660 can comprise flash memory such as NAND flash or NOR flash memory, phase change memory, magnetic memory, among other solid state storage technologies. As shown in FIG. 6, storage system 660 includes system software 662, as well as content 661 stored in storage space 665. As described above, system software 662 can be a non-volatile storage space for applications 630 and OS 640 during a powered-down state of cache node 600, among other operating software. Content 661 includes cached content, such as the web content examples in FIG. 1, which can include text, data, pictures, video, audio, web pages, scripting, code, dynamic content, or other network content. Content 661 can also include tracking elements, such as transparent GIFs, web bugs, Javascript tracking elements, among other tracking elements. In this example, content 661 includes network content and web pages associated with one or more websites, as indicated by www.gamma.gov, www.alpha.com, and www.beta.net.

Cache node 600 is generally intended to represent a computing system with which at least software 630 and 640 are deployed and executed in order to render or otherwise implement the operations described herein. However, cache node 600 can also represent any computing system on which at least software 630 and 640 can be staged and from where software 630 and 640 can be distributed, transported, downloaded, or otherwise provided to yet another computing system for deployment and execution, or yet additional distribution.

Figure 7:
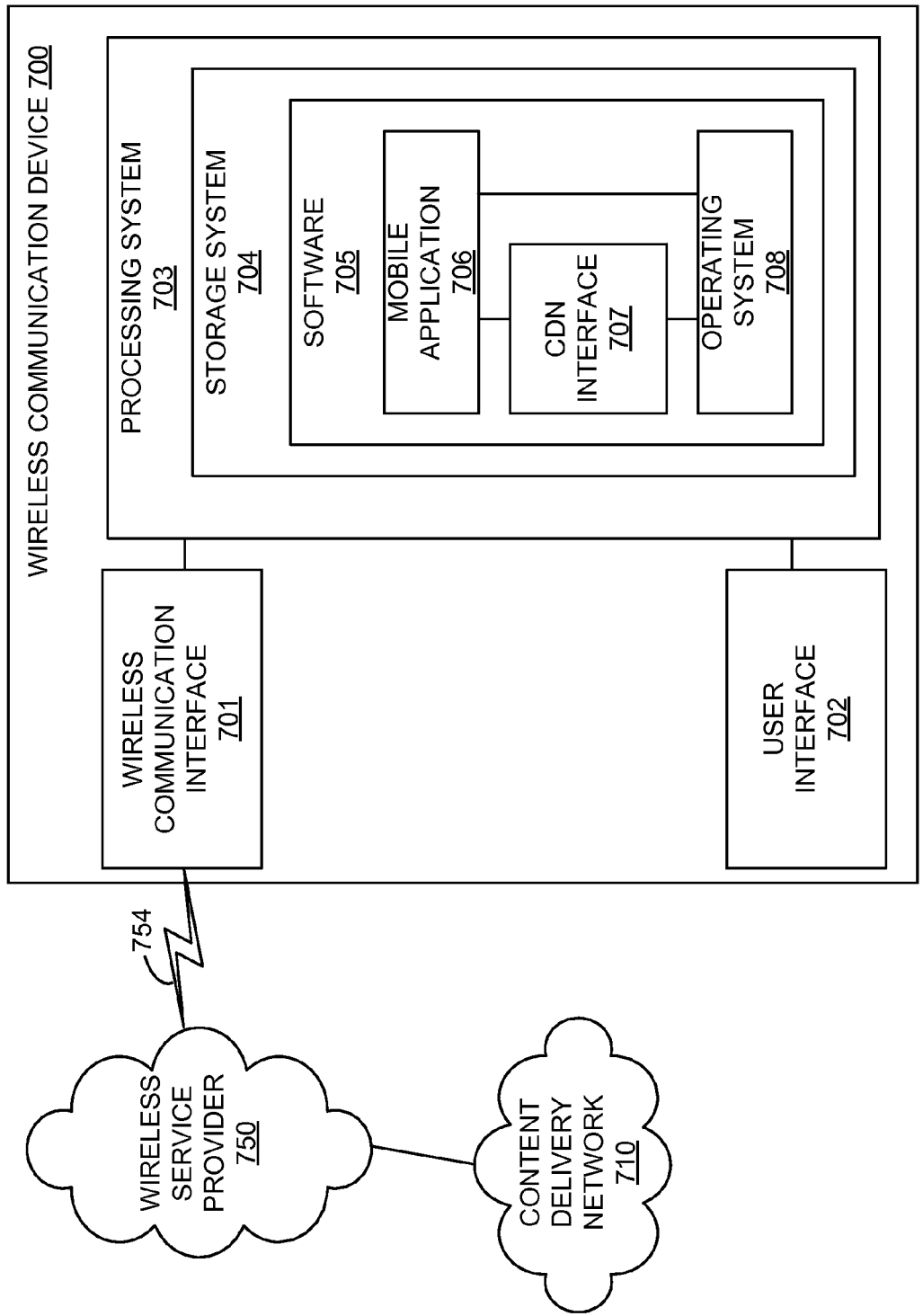
FIG. 7 illustrates a wireless device in communication with a content delivery network.

FIG. 7 illustrates a wireless device in communication with a content delivery network. In FIG. 7, wireless communication device 700 is illustrated operatively coupled to wireless service provider (a.k.a., wireless network) 750 via wireless link 754. Wireless network 750 is operatively coupled to content delivery network 710.

Wireless communication device 700 is an example of wireless device 153 and/or wireless device 353, although wireless device 153 and/or wireless device 353 could use alternative configurations. Wireless communication device 700 comprises wireless communication interface 701, user interface 702, and processing system 703. Processing system 703 is linked to wireless communication interface 701 and user interface 702. Processing system 703 includes processing circuitry and storage system 704 that stores software 705. Wireless communication device 700 may include other well-known components such as a battery and enclosure that are not shown for clarity.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols described herein, such as CDMA, EVDO, WIMAX, GSM, LTE, WIFI, HSPA, or some other wireless communication format.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing system 703 may comprise a microprocessor and other circuitry that retrieves and executes software 705 from storage system 704. Storage system 704 may comprise a disk drive, flash drive, data storage circuitry, or some other memory apparatus. Processing system 703 is typically mounted on a circuit board that may also hold storage system 704 and portions of wireless communication interface 701 and user interface 702.

Software 705 comprises computer programs, firmware, or some other form(s) of machine-readable processing instructions. Software 705 includes mobile application 706, content delivery network interface 707, and operating system 708. Mobile application 706 is operatively coupled to communicate at least with content delivery network interface 707 and operating system 708. Content delivery network interface 707 is operatively coupled to operating system 708. Software 705 may also include additional operating systems, utilities, drivers, network interfaces, applications, or other types of software. When executed by processing system 703, software 705 directs processing system 703 to operate wireless communication device 700 as described herein.

A programmer of mobile application 706 may have enable mobile application 706 to interface with CDN interface 707 by using a software development kit (SDK), application programming interface (API), or other programming tool that allows mobile application 706 to be developed in a way that mobile application 706 can interface with features offered by content delivery network 710. CDN interface 707 may be and/or include a subroutine, procedure call, library, application programming interface, and/or software layer. Mobile application 706 may communicate with content delivery network interface 707 to enable features related to communicating with content delivery network 710 and/or wireless service provider 750. Mobile application 706 may interface with CDN interface 707 as part of accessing content on the internet etc. CDN interface 707 can communicate with operating system 708 to obtain performance information and/or operating conditions on wireless network 750 and/or wireless link 754. This information can be used to configure content delivery network 710. CDN interface 707 may communicate this information to CDN 710 via wireless communication interface 701, wireless link 754, and wireless network 750, as described herein.

Based on information provided by CDN interface 707, content delivery network 710 may select service parameters for the delivery of content to wireless communication device 700. For example, if a throughput obtained from operating system 708 and reported to CDN 710 by CDN interface 707 is less than the throughput CDN 710 can provide the content, CDN 710 may configure itself to slow down the traffic communicated with mobile application 706 and/or wireless device 700. Content delivery network 710 can slow down the traffic communicated with wireless device 700 to better match the actual throughput with wireless device 700 given the conditions of wireless network 750 and/or wireless link 754. This can conserve the resources of CDN 710, wireless network 750, and/or wireless device 700. Other information (e.g., routing information) obtained by CDN interface 707 from operating system 708, and provided to CDN 710 by CDN interface 707, can also be used to alter the configuration or operation of CDN 710.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system, comprising:
providing a content delivery network (CDN) having a set of cache nodes (CN) to provide content delivery on behalf of a set of participating content providers, at least one content provider of the set of content providers sourcing content for delivery by the CDN from an origin server;
receiving, by the CDN, a request for content, the request for content coming from a wireless device and requesting content sourced by the origin server;
receiving, by the CDN and from the wireless device, at least one indicator of wireless device conditions related to RF conditions;
determining that the at least one indicator of wireless device conditions indicates an adverse network condition;
determining, at the CDN, that the CDN is not responsible for the adverse network condition; and,
based on the at least one indicator of wireless device conditions, selecting service parameters for delivery of content requested by the wireless device.

2. The method of claim 1, wherein the at least one indicator of wireless device conditions is based on a signal strength being experienced by the wireless device.

3. The method of claim 1, wherein the selected service parameters includes a selection of a cache node of the set of cache nodes to provide the content requested by the wireless device.

4. The method of claim 3, wherein the selected service parameters includes a selection of a route from the selected cache node of the set of cache nodes to a wireless network access gateway to provide the content requested by the wireless device.

5. The method of claim 4, wherein the wireless network access gateway provides a wireless network serving the wireless device with access to the internet.

6. The method of claim 1, wherein the selected service parameters includes a selection of a throughput for delivery of the content requested by the request for content.

7. The method of claim 1, wherein the at least one indicator of wireless device conditions is based on an interference being experienced by the wireless device.

8. The method of claim 1 wherein the step of determining, at the CDN, that the CDN is not responsible for the adverse network condition comprises determining, at the CDN, that the adverse network condition is not caused by the selection of a cache node (CN) from the set of cache Nodes (CN).

9. A communication system, comprising:
a content delivery network (CDN) having a set of cache nodes (CN) to provide content delivery on behalf of a set of participating content providers, at least one content provider of the set of content providers sourcing content for delivery by the CDN from an origin server, the CDN to receive a request for content from a wireless device, the request for content directed to obtaining content from the origin server that is cached by the CDN; and, a processor to:
  receive from the wireless device at least one indicator of wireless device conditions related to RF conditions;
  determine that the at least one indicator of wireless device conditions
  indicates an adverse network condition;
  determine, at the CDN, that the CDN is not responsible for the adverse network condition; and,
  based on the at least one indicator of wireless device conditions, select content delivery conditions for delivery of cached content from the CDN to the wireless device.

10. The communication system of claim 9, wherein the at least one indicator of wireless device conditions is based on an air-interface signal strength measured by the wireless device.

11. The communication system of claim 9, wherein the content delivery conditions for delivery of cached content from the CDN to the wireless device includes a selection of a cache node of the set of cache nodes to provide the content requested by the wireless device.

12. The communication system of claim 11, wherein the content delivery conditions for delivery of cached content from the CDN to the wireless device includes a selection of a route from the selected cache node of the set of cache nodes to a wireless network access gateway that provides the content to wireless device.

13. The communication system of claim 9, wherein the content delivery conditions for delivery of cached content from the CDN to the wireless device includes a selection of a throughput for delivery of the content to the wireless device.

14. The communication system of claim 9, wherein the at least one indicator of wireless device conditions is based on an interference measured by the wireless device.

15. The communication system of claim 9, wherein a processor to determine, at the CDN, that the CDN is not responsible for the adverse network condition comprises a processor to determine, at the CDN, that the adverse network condition is not caused by the selection of a cache node (CN) from the set of cache nodes (CN).

16. A method of operating a content delivery network (CDN), comprising:
  receiving from a wireless device a request for content to be provided by the CDN on behalf of an origin server;
  configuring the wireless device to provide the CDN with at least one wireless device conditions indicator related to RF conditions;
  determining that the at least one indicator of wireless device conditions indicator indicates an adverse network condition;
  determining, at the CDN, that the CDN is not responsible for the adverse network condition; and,
  based on the at least one wireless device conditions indicator, selecting a CDN configuration to provide requested content to the wireless device.

17. The method of claim 16, wherein content delivery conditions for delivery of requested content from the CDN to the wireless device include a selection of a cache node of a set of cache nodes of the CDN to provide the content requested by the wireless device, wherein the CDN configuration includes a route from the selected cache node to an access gateway of a wireless communication network serving the wireless device.

18. The method of claim 16, wherein the CDN configuration includes a throughput from a cache node of the CDN that is to provide the requested content to the wireless device.

19. The method of claim 16, wherein at least one wireless device conditions indicator is based on a signal strength statistic being experienced by the wireless device.

20. The method of claim 16, wherein at least one wireless device conditions indicator is based on an interference being experienced by the wireless device.

21. The method of claim 16, wherein the step of determining, at the CDN, that the CDN is not responsible for the adverse network condition comprises determining, at the CDN, that the adverse network condition is not caused by the selection of a cache node (CN) from the set of cache Nodes (CN).

* * * * *